Figure 1:
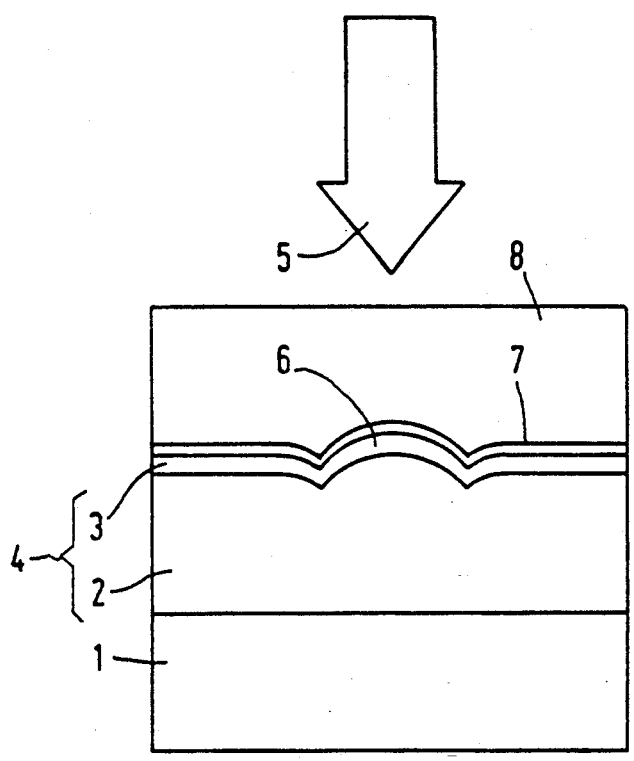

United States Patent [19]

Van Liempd et al.

[11] Patent Number: 5,214,632
[45] Date of Patent: May 25, 1993

[54] METHOD OF MANUFACTURING A MATRIX AND A MASTER PLATE SUITABLE FOR USE IN THE METHOD

[75] Inventors: Johannes P. J. G. Van Liempd; Josephus M. Wijn, both of Eindhoven, Netherlands; George H. Johnson, Wilmington; Howard E. Simmons, Newark, both of Del.

[73] Assignees: U.S. Philips Corporation, N.Y.; Du Pont Optical Company, Nieuwegein, Netherlands

[21] Appl. No.: 266,186

[22] Filed: Nov. 2, 1988

[30] Foreign Application Priority Data

Dec. 23, 1987 [NL] Netherlands ............... 8703108

[51] Int. Cl.$^5$ .............. G11B 7/26; G11B 7/24
[52] U.S. Cl. .................. 369/272; 369/100; 369/284; 346/76 L
[58] Field of Search ........... 369/100, 275.4, 272, 369/284, 286; 396/76 L; 428/64; 430/945, 495

[56] References Cited

U.S. PATENT DOCUMENTS

| | | | |
|---|---|---|---|
| 4,360,895 | 11/1982 | Cornet | 369/100 X |
| 4,398,203 | 8/1983 | Cornet | 369/100 |
| 4,430,401 | 2/1984 | Wilkinson | 346/76 R |
| 4,719,615 | 1/1988 | Feyrer et al. | 346/76 L |
| 4,780,867 | 10/1988 | Lind et al. | 369/100 |
| 4,825,430 | 4/1989 | Halter et al. | 369/284 X |
| 4,852,075 | 7/1989 | Feyrer et al. | 369/284 X |
| 4,950,520 | 8/1990 | Imai et al. | 369/284 |

FOREIGN PATENT DOCUMENTS 0022313 1/1981 European Pat. Off. .
0136070 4/1987 European Pat. Off. .

Primary Examiner—Stuart S. Levy
Assistant Examiner—Joseph A. Rhoa
Attorney, Agent, or Firm—Norman N. Spain

[57] ABSTRACT

The invention relates to a method of manufacturing a metal matrix suitable for use in the manufacture of optical discs, in which a master plate is used which comprises a recording double layer of a synthetic resin in which each layer comprises a laser light-absorbing dye, the master plate is exposed to modulated laser light in which the laser light in both layers of the recording layer is absorbed and in which as a result of the exposure information bits are formed in the form of bumps having variable longitudinal dimensions and the same width dimensions and the master plate on the side of the recording layer comprises a metal layer which is separated from the master plate, as well as a master plate which is suitable for use in the method described hereinbefore.

3 Claims, 2 Drawing Sheets

METHOD OF MANUFACTURING A MATRIX AND A MASTER PLATE SUITABLE FOR USE IN THE METHOD

BACKGROUND OF THE INVENTION

The invention relates to a method of manufacturing a metal matrix for use in the manufacture of optical discs in which a master plate, which comprises a substrate and a photosensitive recording layer provided thereon is exposed to modulated laser light, in which an information track having a relief structure is formed in the recording layer, the recording layer is provided with a metal layer first by electroless plating and then by electrodeposition, and the resulting metal matrix in which the information track of the master has been copied is separated from the master.

Such a method is known from European Patent Specification 0 022 313. According to this method a master plate is used in the manufacture of a metal matrix the recording layer of which comprises an explosive material, for example nitrocellulose, if desired in combination with a dye. Upon exposure to modulated laser light incomplete explosions are induced (column 7 of EU-PS 0 022 313) as a result of which gases are formed which do not escape but remain enclosed in the material. As a result of the gas pressure bumps are formed in the exposed places. Optionally, a metal layer may be provided over the explosive recording layer in which bumps are also formed as a result of the incomplete explosions which take place in the underlying recording material.

The disadvantage of the known method is that the formation of bumps is a critical process. This means that as a result of small local deviations in the composition of the explosive recording layer and/or local differences in thickness as a result of which, for example, the thermal conductivity varies locally, the induced explosions can easily lead to the formation of holes instead of the desired bumps. The size of the bumps may also vary locally as a result of the deviations mentioned hereinbefore. Another disadvantage is that it is not possible when using the known process to induce bumps which, while having the same width dimension, have different accurately defined longitudinal dimensions. Information bits (bumps) with accurately adjusted longitudinal dimensions, for example, longitudinal dimensions of 0.9, 1.2, 1.5, 1.8, 2.1, 2.4, 2.7 and 3.0 $\mu$m, are necessary for the recording of information which is modulated according to the EFM (eight out of fourteen modulation) system.

SUMMARY OF THE INVENTION

It is an object of the invention to provide a method of the type mentioned in the opening paragraph which does not show the disadvantages mentioned hereinbefore or shows these only to a very small extent.

According to an additional object of the invention a method is provided in which the master plate used comprises accurately defined bumps which, with the same width dimension, may have different longitudinal dimensions.

According to another object of the invention is a method in which the information track copied in the metal matrix has the same accuracy as the information track of the master used.

According to a further object of the invention is provided a method in which after metallisation of the master and the removal of the metal matrix thus obtained the master may be re-used.

According to the invention these objects are achieved by means of a method as described in the opening paragraph which is characterized in that a master plate is used the recording layer of which is a double layer of a synthetic resin in which a first layer of a synthetic resin which engages the substrate has a comparatively high coefficient of expansion and a glass transition temperature which is below room temperature and in which a second layer of synthetic resin which is bonded to the first layer has a comparatively low coefficient of expansion and a glass transition temperature which is above room temperature, both layers of synthetic resin comprising a dye which absorbs the laser light used, and in which information bits are formed in the recording layer as a result of the exposure to laser light which have the form of bumps the longitudinal dimensions of which may be different in the direction of the information track and the width dimensions perpendicularly to the information track are equal or substantially equal.

Figure 2:
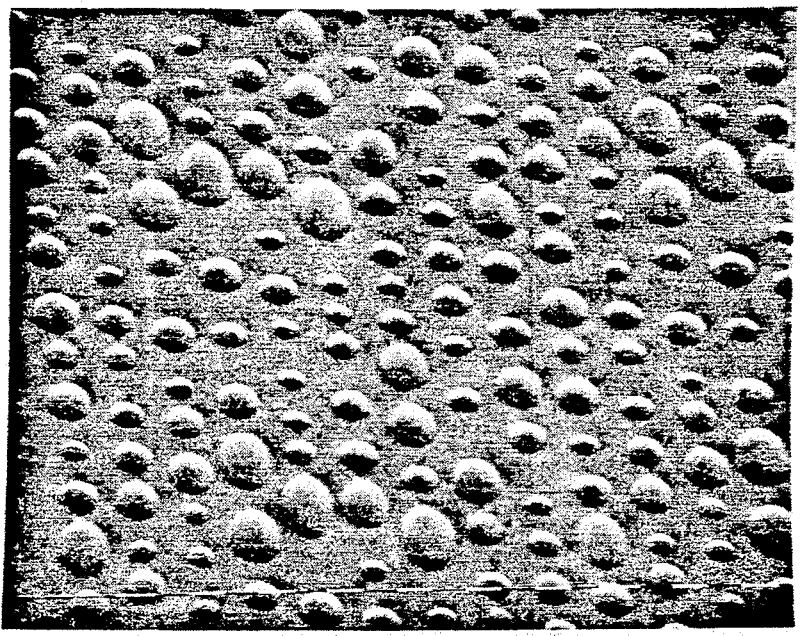
Figure 3:
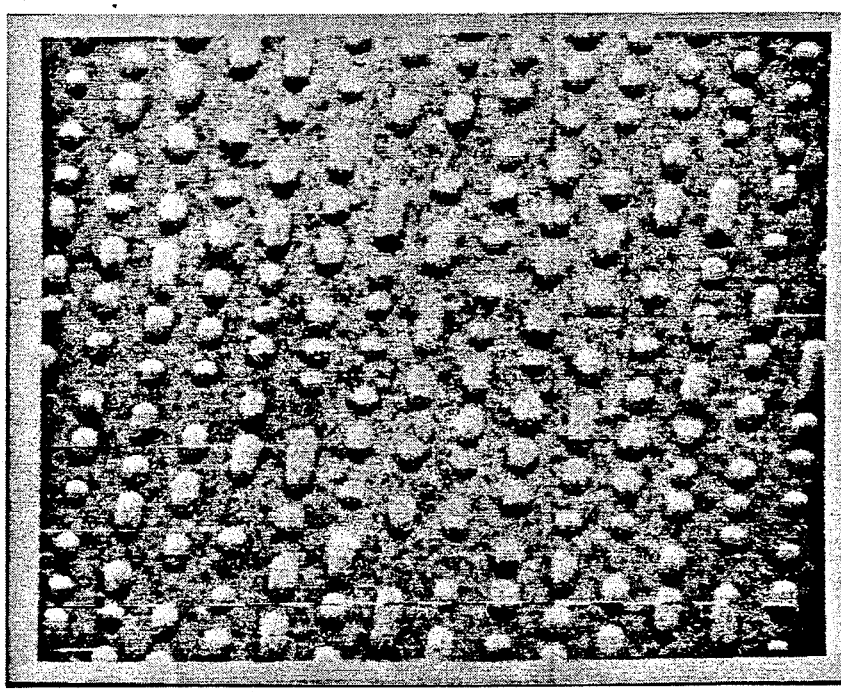

FIG. 1 is a cross-sectional view of a master plate which is used in the method according to the invention, FIG. 2 is an SEM photograph of the surface of recording medium—not according to the invention—in which information bits of different longitudinal dimensions have been recorded, and FIG. 3 is an SEM photograph of a master plate according to the invention in which information bits of different longitudinal dimensions are recorded.

With regard to the recording layer it is to be noted that an erasable optical recording medium in which a double layer is used for the recording of information is known per se from European Patent Application No. 0 136 070. When information is recorded, the lower layer which has a comparatively high coefficient of expansion is heated by means of laser light, the material expanding strongly locally. The top layer having the comparatively low coefficient of expansion is heated only little either by thermal conductivity from the heated lower layer, or directly as a result of the very small absorption of the laser light used. So the top layer is transparent or substantially transparent with respect to the wavelength of the laser light used, while the lower layer strongly absorbs the laser light of the said wavelength. The temperature of the top layer rises to just above the glass transition temperature at which the material is rubbery. As a result of the expansion of the lower layer the top layer is forced up and a bump is formed. Upon cooling, the top layer rapidly gives off the small quantity of heat in which the temperature becomes below the glass transition point and the top layer obtains a rigid structure. The lower layer is still in a heated and hence expanded state. When further cooling, the lower layer cannot further shrink because it is fixed by the top layer bonded thereto. So the bump does not disappear. A tensile force is exerted by the lower layer of the deformed top layer. The recorded information bit, in this case the bump, can be read by means of laser light on the basis of phase differences.

In the erasing process laser light is used of a different wavelength which is absorbed by the top layer and is passed by the lower layer. The top layer is heated to above the glass transition point. As a result of the tensile forces mentioned hereinbefore, exerted by the lower layer, the rubbery heated top layer is reverted to its original position and the bump is erased.

In order to cause that the lower layer at a first wavelength is absorbing and at the second wavelength is transparent and the top layer has just the opposite, namely transparent at the first wavelength and absorbing to laser light of the second wavelength, dyes are used in the lower layer and in the top layer which have an essentially deviating absorption characteristic.

In this European Patent Application it is not stated or suggested that the erasable optical recording medium disclosed therein may be used as a master plate for the manufacture of metal matrices. A series of tests performed by the applicates have demonstrated that the medium known from this European Patent Application cannot be used or is not suitable for direct effect mastering. Direct effect mastering is to be understood to means the manufacture of the master in which no separate developing step is necessary, as in the conventional photo-resist masters. In direct effect mastering the quality of the bit can be optically checked immediately after recording in an information bit. More in particular, experiments performed by the Applicants have demonstrated that in a recording process carried out with the known recording medium mentioned hereinbefore and while using a modulated laser light beam, an increase of the longitudinal dimension of a bit (bump) is also associated with an increase of the width dimension. This is illustrated by means of the accompanying drawing in which FIG. 2 is a photograph showing the surface of the known recording medium after recording bits of different longitudinal dimensions according to both the resultant EFM modulation system mentioned hereinbefore. The track width of the spiral-like information track and also the so-called track pitch, that is the distance between successive coil turns vary. As a result of this the medium is not suitable for use as a master in a mastering process.

By using the above-mentioned method of the invention, in recording EFM modulated information, bits are obtained which with very different longitudinal dimensions have the same or substantially the same width dimension as appears from FIG. 3 which will be explained in greater detail hereinafter.

The first layer of synthetic resin (lower layer) of the recording double layer has a glass transition temperature which is considerably lower than room temperature. The material of this lower layer is consequently rubbery at room temperature. A small area of the lower layer can rapidly be heated by means of little laser light energy as a result of which a rapid and considerable local expansion occurs in which a bit is formed. The lower layer has a cross-linked structure with a comparatively high cross-linking degree so that upon expansion an elastic and no plastic deformation takes place. The material of the lower layer is preferably an elastomer, for example, a natural or synthetic rubber. A suitable material which gives very good results is a polyurethane elastomer.

The material of the second layer of synthetic resin (top layer) of the recording double layer has a glass transition temperature Tg which is well over room temperature, for example, a transition temperature of 80° C. At room temperature the material is vitreous; above the transition temperature the material is rubbery. The thermal expansion is comparatively low. By using a comparatively small quantity of laser light energy an area of the top layer is rapidly heated as a result of which it shows a comparatively small expansion. In contrast with that of lower layer the material of the top layer has a comparatively low modulus of elasticity.

Suitable synthetic resins for the top layer are cross-linked polymers, for example, cross-linked polystyrene, polycarbonate, polyacrylates, polymethacrylates and resins, for example, silicon resins, alkyd resins and epoxy resins. A very good material is a cross-linked epoxy resin. With regard to materials of top layer and lower layer further reference is made to the European Patent Application No. 0 136 070 already referred to which is incorporated in this Specification by reference.

For recording information in the master a laser is preferably used which emits blue light, for example, an argon laser having an emission wavelength of 450 nm or 488 nm or 514 nm. The dyes used in the top layer and lower layer of the recording double layer are red or yellowish orange dyes which absorb light of the above-mentioned wavelength. Chemically different dyes may be used in the top layer and the lower layer provided these dyes absorb bluish green laser light. The quantity of dye in both layers is 1-15% by weight.

In a favorable embodiment the same dye is used in both layers of synthetic resin. As a result of this the manufacture of the master plate used is simplified.

In a further favorable embodiment the ratio of the weight percentage of dye in the second layer of synthetic resin and in the first layer of synthetic resin is 0.3-1.

Examples of suitable dyes are Colour Index (C.I.) Solvent Red 92 and Solvent Red 26.

For further bluish green light-absorbing dyes reference may be made to the Colour Index, in particular the Solvent Red dyes.

After the information has been recorded in the recording layer in the form of bumps of different longitudinal dimensions and the same width dimension, the quality thereof may be established by reading the bits with weak laser light. This may even take place during the recording process so that correction, if any, for example, the adjustment of the objective which focuses the laser light on the recording layer, can immediately be carried out.

A metal layer is then provided by electroplating on the surface of the recording double layer comprising bits, for example, by using a chemical metallization process as described, for example in Technical Proceedings of the American Electroplaters' Society, June 14-18, St. Louis 1964, pages 139-149. A physical deposition process, for example, a vapor deposition or sputtering process, may also be used. A suitable metal layer is a layer of Ag or Ni or Cu. A metal shell, for example, an Ni shell, is then grown on the said conductive layer by electrolytic deposition. The metal layer is finally separated from the master. The resulting metal matrix has an information track which has been copied from the master.

The invention also relates to a master plate which is suitable and is intended for use in the above-described method according to the invention. This master plate comprises a substrate plate which on one side has a recording double layer of a synthetic resin in which a first synthetic resin layer which engages the substrate has a comparatively high coefficient of expansion and a glass transition temperature which is below room temperature. Further this master plate comprising a second layer of synthetic resin which is bonded to the first layer has a comparatively low coefficient of expansion and a glass transition temperature which is above room temperature. Further, in this master plate both layers of synthetic resin comprise a dye which absorbs the laser light used and in which in the recording layer upon exposure to laser light information bits can be formed which have the form of bumps the longitudinal dimensions of which in the direction of the information track may be different and the width dimensions perpendicularly to the information track are equal or substantially equal.

The invention will now be described in greater detail with reference to the drawing.

Reference number 1 in FIG. 1 denotes a substrate plate of a synthetic resin, for example, polycarbonate. The plate may alternatively be manufactured of glass. An expansion layer (lower layer) 2 is provided on plate 1. Layer 2 comprises a cross-linked urethane elastomer which is commercially available under the tradename of Solithane 113 in which 12% by weight of the dye C. I., Solvent Red 92 (Savinyl Scarlet T.M.) has been finely dispersed or dissolved. Layer 2 is manufactured by a spin coating process in which a solution of the non cross-linked polyurethane in an organic solvent to which the dye has been added is provided centrally on the substrate plate. The substrate plate is then rotated, the solution spreading uniformly over the surface of the plate 1 and the solvent also evaporating. The resulting layer is then cured by heating or exposure to light, for example, UV light. A top layer (retention layer) 3 is provided on the expansion layer 2 also by using spin-coating. Layer 3 comprises a weaking cross-linked epoxy resin on which 6% by weight of the dye C.I., Solvent Red 92 (Savinyl Scarlet T.M.) has been dissolved or finely distributed. Layers 2 and 3 together constitute the recording double layer 4. Recording layer 4 is exposed to a beam of laser light indicated by the arrow 5.

The laser light beam is focused on the recording layer 4 in which the spot size of the beam is 0.5-1.0 micron. The wavelength of the laser light is 458, 488 or 514 nm. The laser light beam is modulated according to EFM. During the recording of information the disc is rotated at a speed of rotation of 3-10 Hz., while the laser light beam 5 moves diametrically over the disc. As a result of this a spiral-like track of bits is formed. In the exposed places the light energy both in the expansion layer 2 and the retention layer 3 is converted into thermal energy. The temperature in both layers increases to far above the glass transition temperature of layer 3. The layers 2 and 3 expand as a result of the rise in temperature, layer 2 expanding more strongly than layer 3 due to the higher coefficient of thermal expansion. As a result layer 3 is stretched by the strongly expanding layer 2 in which, however, no or noteworthy plastic deformation occurs. The bulging remains within the elastic limit. An information bit in the form of a bump 6 is formed. Upon cooling the temperature of the retention layer 3 drops to below the glass transition temperature, the layer becoming rigid and further deformation being no longer possible. The lower layer is still in the expanded state. Thus the information bit does not disappear but remains.

The longitudinal dimension of the bit is from 0.9 to 3.0 μm with intermediate steps of 0.3 μm. The length of the bit is determined by the exposure time which, for example, varies from 0.25 μs to 5 μs. The power of the laser used is, for example, from 1 mW on the disc, for example, 4 mW.

The resulting information track of information bits is shown in FIG. 3. It can clearly be seen that the width dimension of the various bits is equal or substantially equal. As a result of this the track width as well as the track pitch are well defined. If a recording medium is used in which the recording double-layer comprises a top layer which does not comprise a dye or comprises a non-absorbing dye, heating of the top layer takes place by thermal conductivity from the lower layer and/or by the low absorption in the top layer itself. It is clearly visible in FIG. 2 that the resulting bits with a larger length dimension (as a result of a longer exposure time) also have a larger width. The track width and the track pitch are not readily defined. Such a recording medium is not suitable for mastering.

After the formation of the bits (FIG. 1) a metal layer 7, for example, of Ag, is vapor-deposited. An Ni shell 8 is provided by electroplating on the metal layer 7. Finally the formed metal matrix 7, 8 is removed from the master disc 1-4.

What is claimed is:

1. A method manufacturing a metal matrix for use in the manufacture of optical discs in which a master disc which comprises a substrate and a photosensitive recording layer provided thereon is exposed to modulated laser light thereby causing an information track having a relief structure to be formed in the recording layer, the recording layer is provided with a metal layer first by electroless deposition and then by electroplating, and the resulting metal matrix in which the information track of the master has been copied is separated from the master, characterized in that a master disc is used the recording layer of which is a double layer of synthetic resins in which a first layer of synthetic resin which contacts the substrate has a comparatively high coefficient of expansion and a glass transition temperature which is below room temperature and in which a second layer of synthetic resin, which is bonded to the first layer, has a comparatively low coefficient of expansion and a glass transition temperature which is above room temperature, both layers of synthetic resin comprising identical dyes which dyes absorbs the laser light used, and in which bump-shaped information bits are formed in the recording layer as a result of exposure to laser light, said bits having longitudinal dimensions varying in a direction parallel to the information track and width dimensions perpendicular to the information track which are at least substantially equal.

2. A method as claimed in claim 1, characterized in that the ratio of the weight percentage of dye in the second layer of synthetic resin (top layer) and in the first layer of synthetic resin (lower layer) is 0.3-1.

3. A master disc comprising a substrate which is provided on one side with a recording double layer of synthetic resins, in which double layer bump-shaped information bits are capable of being formed upon exposure of said double layer to modulated laser light, said information bits forming together an information track having a relief structure and said bits having longitudinal dimensions varying in a direction parallel to the information track and width dimensions which are at least substantially equal and are perpendicular to the information track, a first layer of said double layer contacting the substrate having a comparatively high coefficient of expansion and a glass transition temperature which is below room temperature and a second layer of said double layer, bonded to said first layer, having a comparatively low coefficient of expansion and a glass transition temperature which is above room temperature, both layers comprising the same dye which dye is capable of absorbing said modulated laser light, said master disc being useful for manufacturing a metal matrix particularly adapted for manufacturing optical discs.

* * * * *